G. M. Sickels,

Water Meter.

No. 3721. Reissued Nov. 9. 1869.

Witnesses.

S. N. Piper

L. N. Möller

Thomas Parsons.

by his attorney.

R. Eddy

United States Patent Office.

THOMAS PARSONS, OF BROOKLINE, MASSACHUSETTS, ASSIGNEE OF GERARD SICKELS.

*Letters Patent No.* 77,542, *dated May* 5, 1868; *reissue No.* 3,721, *dated November* 9, 1869.

IMPROVEMENT IN WATER-METERS.

The Schedule referred to in these Letters Patent and making part of the same.

*To all persons to whom these presents may come*

Whereas, Letters Patent of the United States of America, numbered 77,542, and dated the 5th day of May, A. D. 1868, have been granted to GERARD SICKELS, now or late of Boston, of the county of Suffolk, and State of Massachusetts, for an Improvement in Water-Meters; and whereas, such patent has been assigned to the undersigned, THOMAS PARSONS, of Brookline, of the county of Norfolk, and State aforesaid; and whereas, by reason of a defective or insufficient description or specification and claims, the said Letters Patent are believed to be inoperative and invalid, or not fully available to me, the said PARSONS; and whereas, I have asked leave to surrender the same, and requested that new Letters Patent may issue to me on the said invention, on a new or amended specification:

Now, therefore, I do hereby declare the said invention to be fully described in the following specification, and to be represented in the accompanying drawings, making part thereof.

Of the said drawings—

Figure 1:
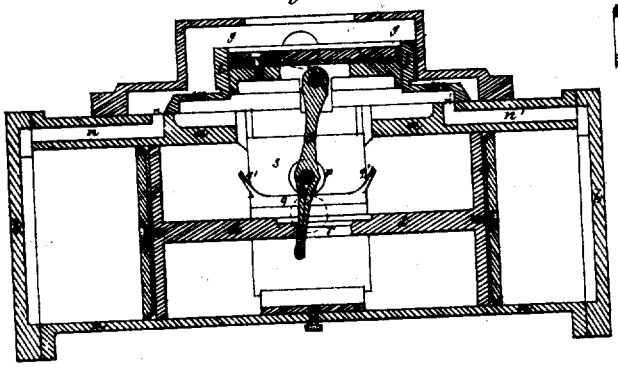
Figure 1 represents a longitudinal and vertical section of the apparatus, such section being taken through the axis of the main cylinder thereof.

The nature or principle of the apparatus or mechanism comprises a main cylinder, its ports, piston, and valve, an auxiliary piston and cylinder, and a mechanism for operating the latter piston by the piston of the main cylinder, while in movement, within such cylinder, the whole to be operated by water, or other fluid, under pressure, while passing through the apparatus.

The mechanism, engine, or apparatus, contains a peculiar mechanism, or combination of parts, by which the auxiliary piston and valve are put in operation by the main piston.

It also includes a novel arrangement of the auxiliary piston and cylinder with the main valve, the main cylinder, and its valve-chest.

The invention has for its object the production of a simple, cheap, and efficient apparatus to effect, by means of a suitable registering-mechanism, or clock, applied to it, the measure of the amount of water or fluid which, from time to time, may flow through the main cylinder and other parts of the apparatus.

In figs. 1, 2, 3, and 4, of the drawings—

*a* denotes the main cylinder, provided with two heads, *b b*.

It also has two ports, *n n'*, leading into it, at or near its opposite ends.

Within the said cylinder is a double-headed piston, composed of two heads, *c c*, united by a bar or stem, *d*, such stem having a slot, *r*, made through its middle.

The lower arm of a lever, *o*, is projected into this slot, such lever having its upper arm hinged to the auxiliary piston *k*, which is adapted to move vertically within a short auxiliary cylinder, *l*.

This latter cylinder is erected on a slide-valve, *m*, and is open both at top and bottom.

The said valve is to operate within an induction-chamber or valve-case, *g*, arranged on the side of the main cylinder, the valve-seat having the ports *n n'* leading from it.

Through the said seat, and between the mouths of its ports, there is a passage, opening into the main cylinder between the heads of its piston.

The fulcrum of the lever *o* is provided with rollers or wheels, *p p*, whose peripheries rest on a supporting-shelf or seat, *q*, which is upheld within the main cylinder, in the position as represented in the drawings, by means of two standards, *s s*.

The seat or shelf *q* is curved upward at its ends, as shown at *q' q'*, such being so as to act as abutments, to arrest the progress of the rollers *p p* at the limits of motion of the latter, in both directions.

Figure 4:
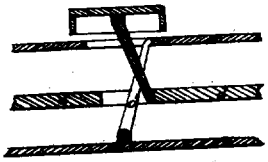
Figure 4 is a diagram, exhibiting a modification of the device or mechanism for operating the auxiliary piston, by means of the main piston of the engine or apparatus.

The lever *o*, instead of being supported by rollers, resting on a shelf or tablet, as described, may be pivoted to an auxiliary lever, *o'*, as represented in fig. 4, this latter lever being hinged or pivoted to the lower part of the cylinder *a*, the slot in the cylinder serving to arrest the movements of the lever *o'* at the proper times.

A suitable registering-mechanism, for determining the quantities of water which may pass through the apparatus from time to time, may be arranged on the cap of the apparatus, so as to be operated by the auxiliary piston while in movement.

The operation of the engine or apparatus, or water-meter, as it may be termed, may be thus explained:

The water, on being introduced, under pressure, into the induction or valve-chamber *g*, will, by its action on the valve, crowd such down upon its seat. It will also press downward on the auxiliary piston *k*. At the same time, water will flow into the uncovered or open port, and thence into the main cylinder, at one end thereof. The water, by pressure against such end, and the next adjacent head of the double-headed or main piston, will cause such piston to be moved toward the other end of the main cylinder.

During such movement, the lever *o* will be moved along into and beyond a vertical position, the auxiliary piston *k* rising or being forced upward within the cylinder *l*, in the meantime. As soon as the lever *o* is moved into and beyond the vertical position, the pressure of the water on the auxiliary piston will force the piston down, and cause the lever to so act on the valve as to move it across the open port, and past the other port, so as to open the latter, and thereby allow the water to flow into it, and act against the other head of the main piston, and also allow water to escape, through the first port, into the space between the heads of the piston.

The said main piston will next be driven in an opposite direction, and the water previously let into the cylinder will be expelled through the eduction-passage *i*. The main piston will first be moved in one direction, and next on the opposite one, the valve being so moved on its seat, during each of such movements, as to cause the valve, by its pressure, to reverse the motion of the main piston, and expel from the cylinder the water against which the said piston may be driven.

Having thus explained the invention,

What I claim, as such, is as follows:

The combination of the main cylinder *a*, its ports *n n'*, valve *m*, and piston *c c d*, with the auxiliary piston *k* and cylinder *l*, and a mechanism, substantially as described, (viz, the lever *o*, its rollers *p*, and supporter *q*, provided with abutments *q'*,) for operating the latter piston by the main piston, while in movement in its cylinder, as set forth.

Figure 2:
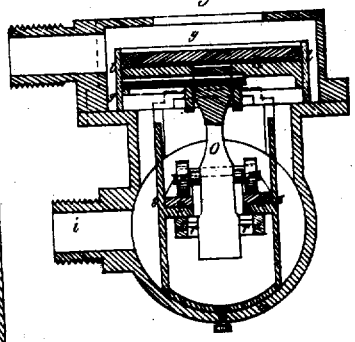
Figure 2 is a transverse section of the same.
Figure 3:
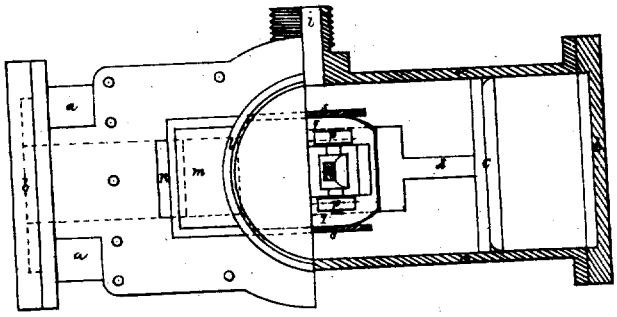
Figure 3 is a top view, in part, and a horizontal section, in part, of it.

Also, the peculiar mechanism or combination shown in figs. 1, 2, and 3, and substantially as described, by which the auxiliary piston and the main valve are put in operation, through the action of the main piston, within its cylinder, such mechanism consisting of the lever *o*, its rollers *p*, and supporter *q*, provided with the projections or abutments *q'*, as described.

Also, the arrangement, shown in figs. 1 and 2, of the auxiliary piston and cylinder with the main valve, the main cylinder, and its valve-chest.

Also, the combination of the auxiliary piston and cylinder with the main valve, and mechanism, as described, for effecting the movements of the auxiliary piston, through the action of the main piston, as specified.

Also, the arrangement and combination of the lever *o* with the auxiliary and main pistons, so as to be operated by the latter, and be caused to operate the auxiliary piston, in manner as explained.

THOMAS PARSONS.

Witnesses:
R. H. EDDY,
S. N. PIPER.